(12) United States Patent
Proctor

(10) Patent No.: US 6,263,191 B1
(45) Date of Patent: Jul. 17, 2001

(54) SIGNAL IMPROVEMENT FOR A WIRELESS COMMUNICATION SYSTEM

(75) Inventor: Lee Michael Proctor, Cary, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/160,653

(22) Filed: Sep. 25, 1998

(51) Int. Cl.[7] .................................................. H04B 1/00
(52) U.S. Cl. ................................................ 455/69; 455/522
(58) Field of Search .............................. 455/69, 522, 355, 455/570, 88, 229

(56) References Cited

U.S. PATENT DOCUMENTS

| | | | |
|---|---|---|---|
| 6,067,446 | * | 5/2000 | Persson ................................... 455/69 |
| 6,075,974 | * | 6/2000 | Saints et al. ............................ 455/69 |
| 6,085,107 | * | 5/2000 | Persson et al. ........................ 455/522 |
| 6,085,108 | * | 7/2000 | Knutsson et al. ..................... 455/522 |

* cited by examiner

*Primary Examiner*—Vivian Chang
*Assistant Examiner*—Naghmeh Mehrpour
(74) *Attorney, Agent, or Firm*—Kenneth A. Haas

(57) ABSTRACT

A remote unit's (113) volume level is controlled locally through a user interface (105). The user interface (105) converts volume-up and volume-down instructions to an appropriate volume-up or volume-down command signal which is passed through a controller (107) to a local amplifier (111). When the local amplifier (111) is operating at a maximum gain level, and a user still perceives the audio output as being inadequate, an increase in volume results in the controller (107) sending a volume-up message via transmit circuitry (103) to infrastructure equipment (115). Upon receiving the volume-up message an amplifier (125) existing within the infrastructure equipment (115) increases its gain.

14 Claims, 4 Drawing Sheets

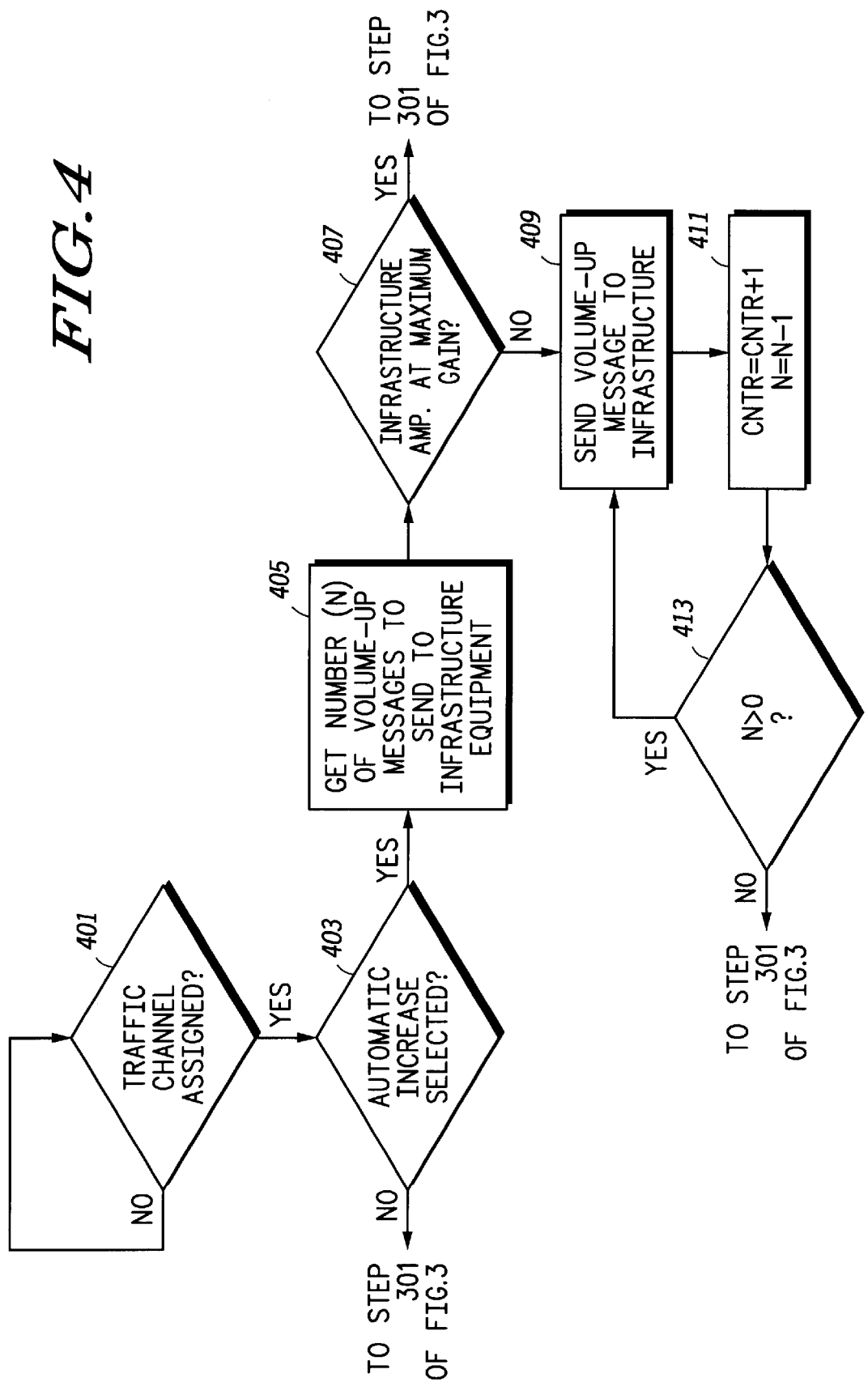

“Personal Station- Base Station Compatibility Requirements for 1.8 to 2.0 GHz Code Division Multiple Access (CDMA) Personal Communication Systems” (American National Standards Institute (ANSI) J-STD-008), but in alternate embodiments communication system 100 may utilize other analog or digital wireless communication system protocols such as, but not limited to, the Narrowband Advanced Mobile Phone Service (NAMPS) protocol, the Advanced Mobile Phone Service (AMPS) protocol, the Global System for Mobile Communications (GSM) protocol, the Personal Digital Cellular (PDC) protocol, or the United States Digital Cellular (USDC) protocol.

SIGNAL IMPROVEMENT FOR A WIRELESS COMMUNICATION SYSTEM

FIELD OF THE INVENTION

The present invention relates generally to wireless communication systems and, in particular, to signal improvement for such wireless communication systems.

BACKGROUND OF THE INVENTION

Often times an operator of a wireless remote unit cannot adequately configure the remote unit to provide an acceptable quality level for a received signal. For example, many remote unit subscribers operate their remote units permanently at a maximum volume level, and in many cases this level can still be inadequate for a perceived good-quality call. Therefore a need exists for a method and apparatus to improve the quality of a received signal, above and beyond the quality level that is capable of being achieved by the wireless remote unit alone.

BRIEF DESCRIPTION OF THE DRAWINGS

FIG. 4 is a flow chart showing operation of the remote unit of FIG. 1 in accordance with an alternate embodiment of the present invention.

DETAILED DESCRIPTION OF THE DRAWINGS

To address the need for a signal improvement in a wireless communication system, a method and apparatus to improve the quality of a received signal is provided. The method and apparatus provide for a remote unit's volume level to be controlled locally through a user interface. The user interface converts volume-up and volume-down instructions to an appropriate volume-up or volume-down command signal which is passed through a controller to a local amplifier. When the local amplifier is operating at a maximum gain level, and a user still perceives the audio output as being inadequate further volume requests result in the controller sending a volume-up message via transmit circuitry to infrastructure equipment. In response the infrastructure equipment increases gain using an amplifier existing within the infrastructure equipment.

The present invention encompasses a remote unit for use in a communication system. The remote unit comprises a first signal quality control means for controlling circuitry local to the remote unit for adjustment of a quality parameter of a signal output by the remote unit, and a second signal quality control means for instructing circuitry remote from the remote unit for adjustment of the quality parameter of the signal output by the remote unit.

The present invention additionally encompasses an apparatus existing in a wireless communication system. The wireless communication system comprises a remote unit capable of controlling circuitry local to the remote unit for adjustment of a quality parameter of a signal output by the remote unit. The apparatus comprises receive circuitry having a message sent in a wireless manner as an input and outputting a downconverted message, and a controller having the downconverted message as an input and in response to the downconverted message, controlling circuitry remote from the remote unit for adjustment of the quality parameter of the signal output by the remote unit.

The present invention finally encompasses a method for signal adjustment in a wireless communication system. The method comprises the steps of receiving a request to adjust a signal quality parameter of a signal output by a remote unit and determining if the signal quality parameter should be adjusted by circuitry local to the remote unit. The signal quality parameter is adjusted with the circuitry local to the remote unit if the signal quality parameter is capable of being adjusted by circuitry local to the remote unit, otherwise a message is sent to circuitry remote from the remote unit for adjustment of the signal quality parameter.

Figure 1:
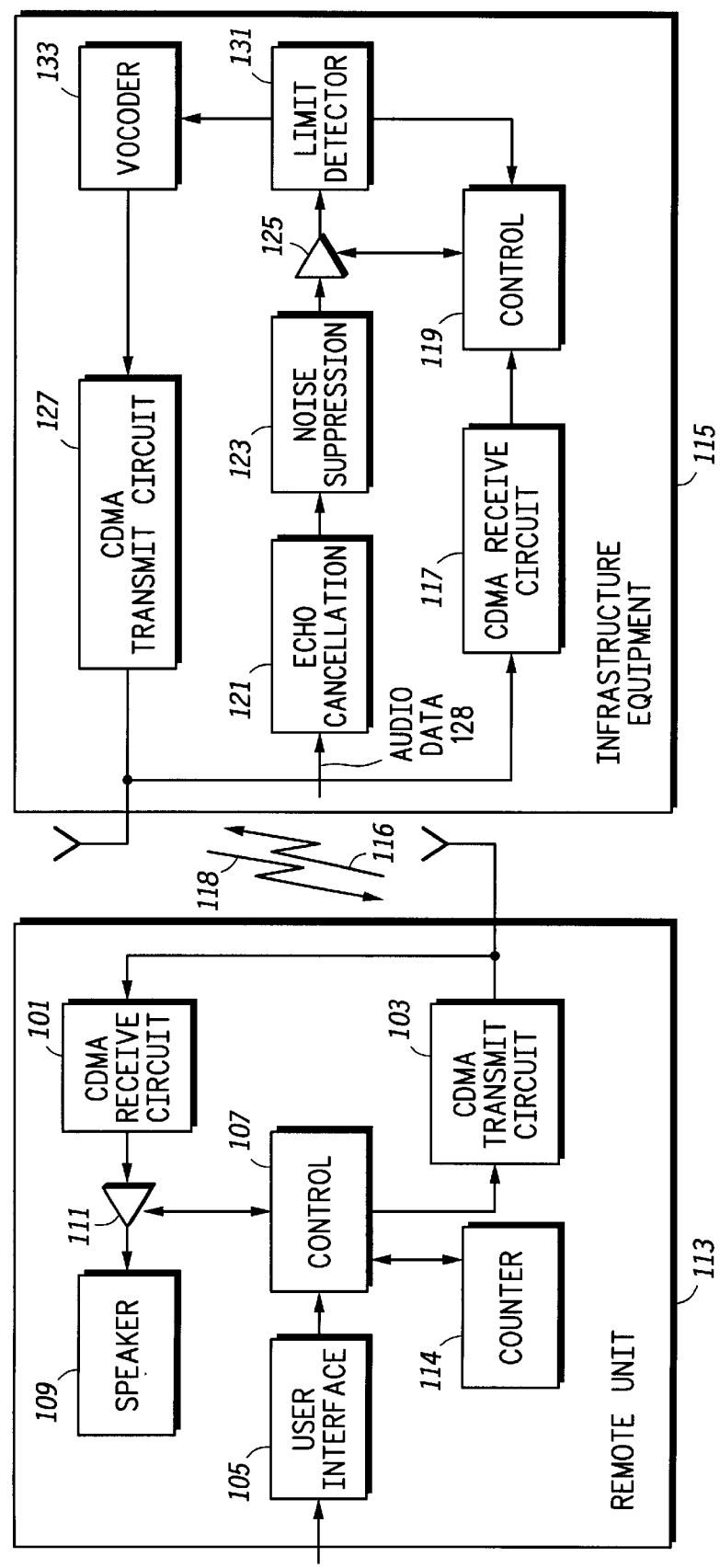
FIG. 1 is a block diagram of a wireless communication system in accordance with the preferred embodiment of the present invention.

Turning now to the drawings, wherein like numerals designate like components, FIG. 1 is a block diagram of wireless communication system 100 in accordance with the preferred embodiment of the present invention. In the preferred embodiment of the present invention, communication system 100 utilizes a Code Division Multiple Access (CDMA) system protocol as described in Communication system 100 includes remote unit 113 and infrastructure equipment 115. Infrastructure equipment 115 contains receive circuitry 117 (CDMA receive circuitry), transmit circuitry 127 (CDMA transmit circuitry), echo cancellation circuitry 121, noise suppression circuitry 123, infrastructure amplifier 125, limit detection circuitry 131, and control circuitry 119. Although all of the above circuitry is shown existing within a single piece of infrastructure equipment 115, one of ordinary skill in the art will recognize that the above circuitry can be distributed among separate pieces of infrastructure equipment such as Base Transceiver Stations (BTSs), Centralized Base Station Controllers (CBSCs), and Mobile Switching Centers (MSCs). Remote unit 113 comprises receive circuitry 101, transmit circuitry 103, speaker 109, local amplifier 111, control circuitry 107, vocoder 133, and user interface 105.

The description of the preferred and alternate embodiments of the present invention will be discussed below with respect to establishing an acceptable volume level for a received signal, however one of ordinary skill in the art will recognize that the present invention can be applied to establishing an acceptable quality level for any multitude of signal parameters (e. g., frequency gain, bass, treble, . . . , etc.) without varying from the scope of the present invention.

During operation, the remote unit's volume level is controlled locally through user interface 105. That is, an operator of remote unit 113 can locally control the volume level via a volume-up and a volume-down interface 105 existing on remote unit 113. User interface 105 converts volume-up and volume-down instructions to an appropriate volume-up or volume-down command signal which is passed through controller 107 to local amplifier 111. In response, local amplifier 111 increases or decreases the amplifier gain accordingly, resulting in an increased or decreased audio output (respectively) from speaker 109. As discussed above, often times an operator of wireless communication equipment cannot adequately configure the equipment to provide acceptable quality for a received signal. More particularly, local amplifier 111 may be operating at a maximum gain level, and a user may still perceive the audio output from speaker 109 as being inadequate. In the preferred embodiment of the present invention, if an operator requests a change in volume for speaker 109, and local amplifier 111 is operating at its maximum amplification, controller 107 sends a volume-up message (discussed below with reference to Table 1) via transmit circuitry 103 to infrastructure equipment 115. The volume-up message is properly spread, modulated, and up converted for over-the-air transmission via uplink communication signal 116. In the preferred embodiment of the present invention, the volume-up message comprises an instruction to infrastructure equipment 115 to increase amplification to infrastructure amplifier 125.

Upon receipt of uplink communication signal 116, infrastructure equipment 115 properly down converts, demodulates, and despreads uplink communication signal 116 (via receive circuitry 117) to recover the volume-up message. The volume-up message is passed to controller 119. Prior to increasing gain to infrastructure amplifier 125, controller 119 determines if infrastructure amplifier 125 is operating at a maximum gain level, and if not, gain is increased to infrastructure amplifier 125.

When an operator of remote unit 113 requests a decrease in volume, interface 105 converts the volume-down instruction to an appropriate volume-down command signal which is passed to controller 107. Instead of immediately decreasing the amplification of local amplifier 111, controller will determine a number of volume-up messages that were sent to infrastructure equipment 115 (if any), and additionally determines if an equal number of volume-down messages were sent to infrastructure equipment 115. Once controller 107 has sent an equal number of volume-down commands to infrastructure equipment 115, controller will decrease the gain of local amplifier 111 upon a volume-down command being received by user interface 105.

Upon receipt of uplink communication signal 116, infrastructure equipment 115 properly down converts, demodulates, and despreads uplink communication signal 116 (via receive circuitry 117) to recover the volume-down message. The volume-down message is passed to controller 119 and controller 119 decreases the gain to infrastructure amplifier 125.

Because signal quality is modified at infrastructure equipment when no further modification can be made at the remote unit, signal quality of the received signal is improved above and beyond the quality that is capable of being achieved by the remote unit alone.

Figure 2:
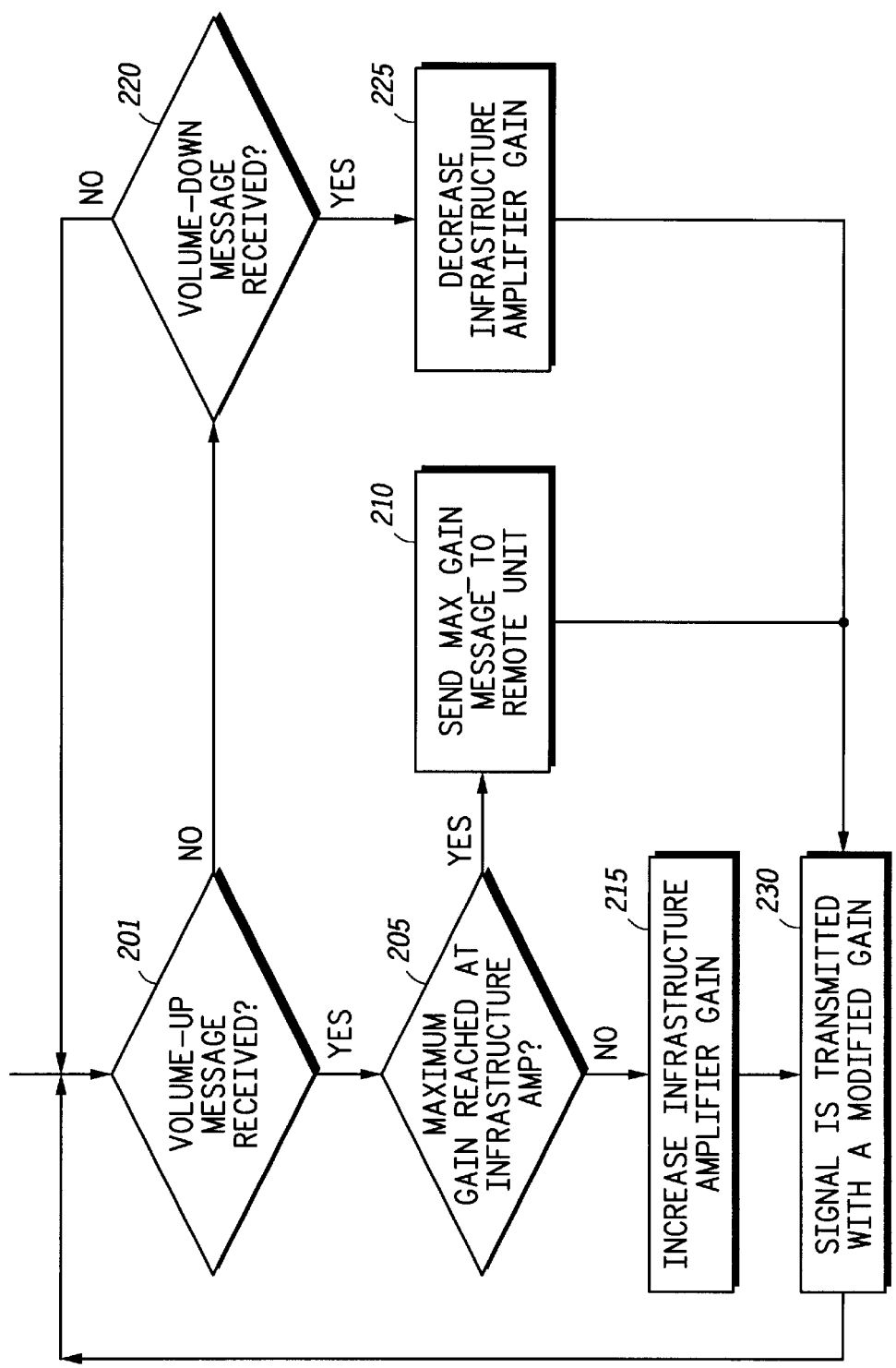
FIG. 2 is a flow chart showing operation of the infrastructure equipment of FIG. 1 in accordance with the preferred embodiment of the present invention.

FIG. 2 is a flow chart showing a more detailed operation of infrastructure equipment 115 in accordance with the preferred embodiment of the present invention. The logic flow begins at step 201 where controller 119 determines if a volume-up message has been received by receive circuitry 117. If at step 201 such a message has been received, the logic flow continues to step 205 where controller 119 determines if infrastructure amplifier 125 is operating at its maximum amplification. In the preferred embodiment of the present invention, the determination that infrastructure amplifier 125 is operating at a maximum amplification is made by limit detector 131. More particularly, limit detector 131 determines whether the audio signal is being clipped or is close to being clipped, and if so, a maximum amplification has been reached. If at step 205 it is determined that a maximum amplification has not been reached, then controller 119 instructs infrastructure amplifier 125 to increase amplification (step 215), and the logic flow continues to step 230. However, if at step 205 it is determined that a maximum amplification has been reached, the logic flow continues to step 210 where a message (MAX_GAIN) is sent to remote unit 113 that indicates to remote unit 113 that infrastructure amplifier 125 is at a maximum gain level. (Further discussion of MAX_GAIN message is discussed below with reference to Table 2). The MAX_GAIN message causes remote unit 113 to cease transmitting volume-up messages, even if user interface 105 instructs controller 107 to do so. Thus, when infrastructure amplifier 125 is at a maximum gain level, remote unit 113 will cease transmission of volume-up messages, even when instructed by user interface 105 to do so. The logic flow then continues to step 230.

Returning to step 201, if at step 201 controller 119 determines that a volume-up message has not been received, the logic flow continues to step 220 where controller determines if a volume-down command has been received. If at step 220 controller 119 determines that a volume-down command has not been received, the logic flow returns to step 201, otherwise the logic flow continues to step 225 where controller 119 decreases amplification to infrastructure amplifier 125, and the logic flow continues to step 230.

At step 230 signal 128 (traffic channel data bits) is transmitted with a modified gain to remote unit 113. More particularly, signal 128 is received by echo cancellation circuitry 121 where echoes induced within the Public Switched Telephone Network (PSTN)(not shown) are suppressed. Echo cancellation circuitry 121 outputs the audio signal, with echoes suppressed, to noise cancellation circuitry 123, where the level of any background noise is reduced. The resulting signal is output to infrastructure amplifier 125 where it is amplified (having a gain level set by controller 119) and sent to vocoder 133 where proper vocoding takes place. The output of vocoder 133 is passed to transmit circuitry 127 where CDMA channel encoding, spreading, and up-conversion takes place. The resulting signal is then radiated by antenna as downlink communication signal 118.

It should be noted that audio level gain could be applied in several places within communication system 100, however in the preferred embodiment of the present invention amplification takes place prior to vocoding operations and speech compression, after any echo cancellation or noise suppression. In the preferred embodiment of the present invention this is done because an echo canceler's performance is optimal when the PSTN network's response is linear, and hence does not vary with time. As the step up/down in amplifier gain would generate a time varying component, it is desirable to place the amplifier after any echo canceling circuitry. Similarly, the noise suppressor performance is optimal when the background noise is fairly predictable or very slowly varying, and would therefore be impacted negatively by large variances in the gain. Hence amplifier 125 is placed after the echo canceller 121 and noise suppressor 123.

Figure 3:
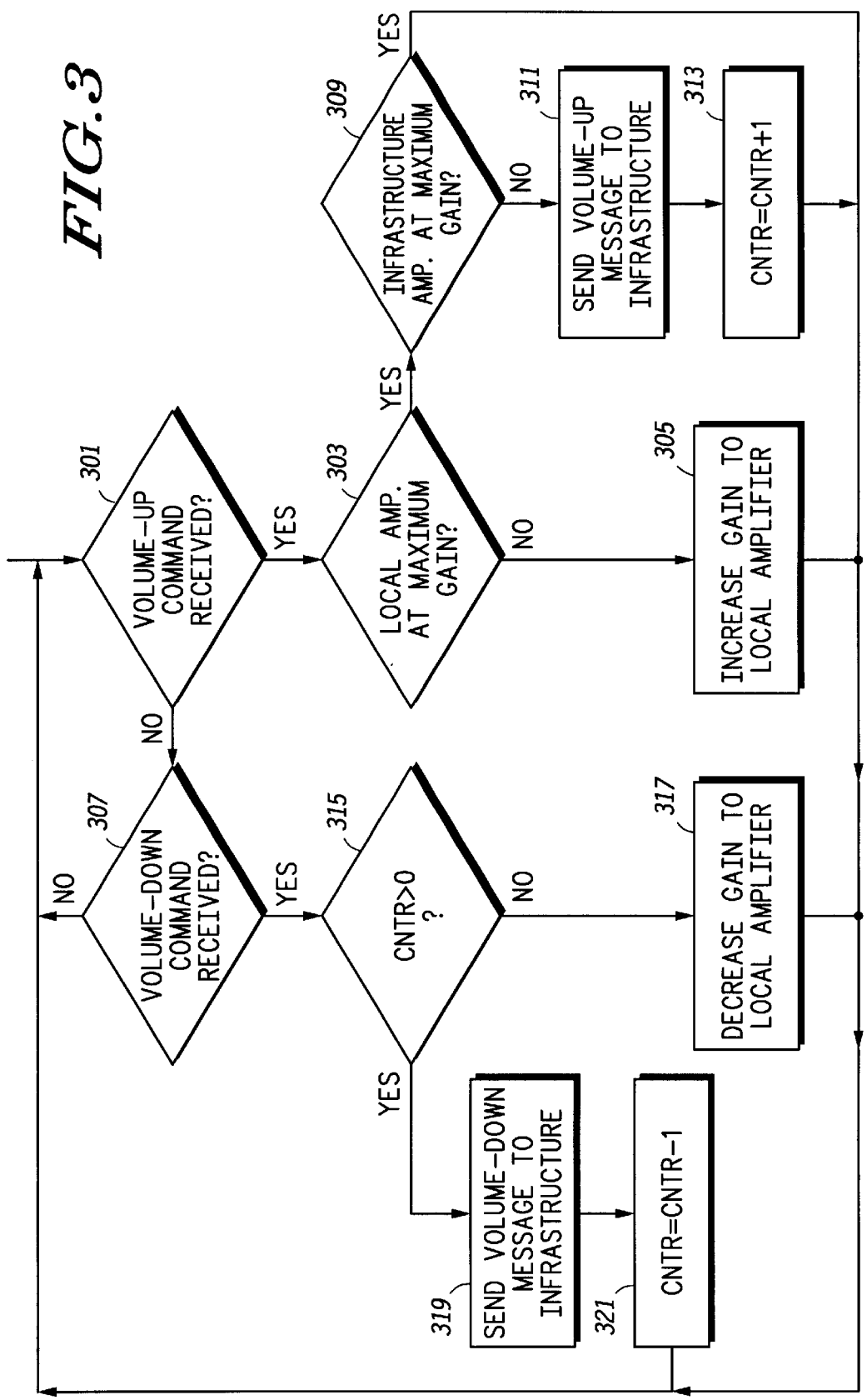
FIG. 3 is a flow chart showing operation of the remote unit of FIG. 1 in accordance with the preferred embodiment of the present invention.

FIG. 3 is a flow chart showing operation of the remote unit of FIG. 1 in accordance with the preferred embodiment of the present invention. The logic flow begins at step 301 where control circuitry 10 7 determines if a volume-up command has been received from user interface 105. If at step 301 a volume up command has been received by user interface 105, the logic flow continues to step 303, otherwise the logic flow continues to step 307. At step 303 control circuitry 107 determines if local amplifier 111 is operating at a maximum gain level, and if not, the gain is increased to local amplifier 111 and the logic flow returns to step 301. However, if at step 303 control circuitry 107 determines that local amplifier 111 is operating at a maximum gain level, the logic flow continues to step 309 where control circuitry determines if a MAX_GAIN message has been received from infrastructure equipment 115. As discussed above, if infrastructure amplifier 125 is operating at a maximum gain, remote unit 113 will cease transmission of volume-up messages to infrastructure equipment 115. Therefore, if a MAX_GAIN message has been received from infrastructure equipment 115 the logic flow returns to step 301, otherwise the logic flow continues to step 311 where a volume-up message is sent to infrastructure equipment 115. Next at step 313 counter 114 is increased by one (CNTR=CNTR+1).

Returning to step 301, as discussed above, if a volume-up command was not received by user interface 105 the logic flow continues to step 307 where it is determined if a volume-down command has been received by user interface 105. If at step 307 a volume down command has not been received from user interface 105, the logic flow returns to step 301, otherwise the logic flow continues to step 315 where control circuitry 107 determines if CNTR>0. If, at step 315 it is determined that CNTR>0, then volume-up messages have been sent to infrastructure equipment 115, and the logic flow continues to step 319 where a volume-down message is transmitted to infrastructure equipment 115 and CNTR is decremented by one at step 321 (i. e., CNTR=CNTR−1). The logic flow then returns to step 301. If, however, CNTR=0, no volume-up messages have been sent to remote unit 115 and the logic flow continues to step 317 where the gain of local amplifier 111 is decreased an appropriate amount. The logic flow then returns to step 301.

FIG. 4 is a flow chart showing operation of the remote unit of FIG. 1 in accordance with an alternate embodiment of the present invention. In the alternate embodiment of the present invention a default volume increment is selected immediately upon traffic channel assignment. It is recognized that many operators of remote units will desire to have the infrastructure volume increased for every call placed by the user. Instead of having the operator manually increase the infrastructure volume for every call, a default volume increment is sent to infrastructure equipment automatically upon traffic channel assignment.

The logic flow begins at step 401 where control circuitry 107 determines if a traffic channel has been assigned, and if not, the logic flow returns to step 401. If, at step 401, control circuitry 107 determines that a traffic channel has been assigned, the logic flow continues to step 403 where control circuitry 107 determines if an automatic increase in infrastructure volume has been selected. If an automatic increase has not been selected, the logic flow proceeds to step 301 of FIG. 3, otherwise the logic flow continues to step 405. At step 405 a number (N) of volume-up-messages to send to infrastructure equipment 115 is retrieved. At step 407 control circuitry 107 determines if infrastructure amplifier 125 is at a maximum gain level (i. e., MAX_GAIN message received), and if so the logic flow proceeds to step 301 of FIG. 3. If infrastructure amplifier 125 is not at a maximum gain level the logic flow continues to step 409 where a volume-up message is sent to infrastructure equipment 115 causing infrastructure amplifier 125 to increase its gain. At step 411 CNTR is incremented by one (CNTR=CNTR+1) and the number of volume-up messages to send is decreased by one (N=N−1). At step 413 it is determined if any volume-up messages remain to be sent to infrastructure equipment 115 (N>0), and if so the logic flow returns to step 409, otherwise the logic flow proceeds to step 301 of FIG. 3.

Table 1 is a preferred embodiment of a power-up and a power-down message. It should be noted that in the preferred embodiment of the present invention Quality_Characteristic is set to 001, which indicates a change in volume. Additionally, Adjustment_Type is set equal to 1, which indicates that a move up or down from the current setting, however in an alternate embodiment of the present invention Adjustment_Type may be set to zero, which indicates a single adjustment up or down from the current setting. Finally, in the preferred embodiment of the present invention Gain is set to 000010, corresponding to a 0.5 dB incremental change.

Although the preferred embodiment of the present invention described above has incremental adjustments to volume being made by a remote unit, in an alternate embodiment of the present invention, a remote unit can make a single volume request that serves to make one gross adjustment to the volume level.

TABLE 1

Power_up and Power_down message

| Field | Number of bits | Use |
|---|---|---|
| MSG_TYPE | 8 bits | 00011000 used to indicate a power-up or power-down message. |
| Ack_Seq | 3 bits | Standard CDMA message field that acknowledges receipt of messages from the infrastructure. |
| Msg_Seq | 3 bits | Standard CDMA message field that indicates the Ack_Seq number to be used by the infrastructure to acknowledge receipt of this message. |
| Ack_Req | 1 bit | Standard CDMA message field that indicates to the infrastructure that an acknowledgement to this message is required |
| Encryption | 2 bits | Indicates the current mode of encryption being used. |
| Quality_Characteristic | 3 bits | Indicates the quality parameter that the remote unit is requesting to change. 001 indicates a volume change |
| Adjustment_Type | 1 bit | 0 indicates an absolute gain setting, 1 indicates up or down from current setting. |
| Adjustment_Direction | 1 bit | If request is for an absolute setting then this field indicates attenuation (0) or gain (1). If request is for up/down adjustment then this field indicates down (0) or up (1). |
| Gain | 6 bits | Indicates the gain/attenuation or incremental change value in dB at a resolution of .25 dB (i.e., 001000 indicates 2 dB). |
| Reserved | 4 bits | Used to fill message space |

Table 2 is a preferred embodiment of a MAX_GAIN message. It should be noted that in the preferred embodiment of the present invention Quality_Characteristic is set to 001, which indicates a halt in volume requests.

Additionally, Request_Control is set equal to 01, which indicates to remote unit 113 to halt power_up messages.

TABLE 2

MAX_GAIN message

| Field | Number of bits | Use |
|---|---|---|
| MSG_TYPE | 8 bits | 00010000 used to indicate a MAX_GAIN message. |
| Ack_Seq | 3 bits | Acknowledges receipt of messages from the remote unit. |
| Msg_Seq | 3 bits | Indicates the Ack_Seq number to be used by the remote unit to acknowledge receipt of this message. |
| Ack_Req | 1 bit | Indicates to the remote unit that an acknowledgement to this message is required. |
| Encryption | 2 bits | Indicates the current mode of encryption being used. |
| Quality_Characteristic | 3 bits | Indicates the quality parameter that the infrastructure is informing the remote unit about. 001 indicates a volume change. |
| Request_Control | 2 bits | 01 indicates to remote unit to suspend increase requests, however in alternate embodiments of the present invention 10 indicates to remote unit to suspend decrease attempts, 11 indicates to remote unit to suspend all requests, and 00 indicates the message is for informational purposes only. |
| Gain_Attenuation_Indication | 1 bit | Indicates to the remote unit whether the infrastructure is currently applying gain or attenuation of the audio characteristics. |
| Current_Gain | 6 bits | Indicates the current gain value in dB at a resolution of .25 dB (i.e., 001000 indicates 2 dB). |
| Reserved | 3 bits | Used to fill message space |

The descriptions of the invention, the specific details, and the drawings mentioned above, are not meant to limit the scope of the present invention. For example, as discussed above, in addition to controlling amplifier gain at infrastructure equipment 115, other signal characteristics may be controlled as well. It is the intent of the inventor that various modifications can be made to the present invention without varying from the spirit and scope of the invention, and it is intended that all such modifications come within the scope of the following claims and their equivalents.

What is claimed is:

1. A remote unit for use in a communication system, the remote unit comprising:
   a first signal quality control means for controlling circuitry local to the remote unit for adjustment of a quality parameter of a signal output by the remote unit, wherein the first signal quality control means comprises a user interface for receiving quality control signals from a user and a controller for converting the quality control signals received from the user to instructions that control the circuitry local to the remote unit for adjustment of the quality parameter; and
   a second signal quality control means for instructing circuitry remote from the remote unit for adjustment of the quality parameter of the signal output by the remote unit.

2. The remote unit of claim 1 wherein the quality parameter is a volume parameter.

3. The remote unit of claim 1 wherein the second signal quality control means comprises:
   a user interface for receiving quality control signals from a user; and
   a controller for converting the quality control signals received from the user to messages to be sent to circuitry remote from the remote unit for adjustment of the quality parameter.

4. The remote unit of claim 3 wherein the messages are sent in a wireless manner to circuitry remote from the remote unit.

5. The remote unit of claim 3 wherein the second signal quality control means stops converting the quality control signals received from the user to messages upon receipt of a second message transmitted from the circuitry remote from the remote unit.

6. The remote unit of claim 1 wherein the communication system is a wireless communication system.

7. In a wireless communication system having a remote unit capable of controlling circuitry local to the remote unit for adjustment of a quality parameter of a signal output by the remote unit, an apparatus for signal adjustment, the apparatus comprising:
   receive circuitry having a message sent in a wireless manner as an input and outputting a downconverted message;
   a limit detector coupled to the controller, the limit detector outputting an indication to the controller that a limit in adjustment to the quality parameter has been reached; and
   a controller having the downconverted message as an input and in response to the downconverted message, controlling circuitry remote from the remote unit for adjustment of the quality parameter of the signal output by the remote unit.

8. The apparatus of claim 7 wherein the quality parameter is a volume parameter.

9. The apparatus of claim 7 further comprising a transmitter coupled to the controller for transmitting a message to the remote unit that a limit in adjustment to the quality parameter has been reached.

10. A method for signal adjustment in a wireless communication system, the method comprising the steps of:
    receiving a request to adjust a signal quality parameter of a signal output by a remote unit;
    determining if the signal quality parameter should be adjusted by circuitry local to the remote unit; and
    adjusting the signal quality parameter with the circuitry local to the remote unit if the signal quality parameter is capable of being adjusted by circuitry local to the remote unit, otherwise sending a message to circuitry remote from the remote unit for adjustment of the signal quality parameter.

11. The method of claim 10 wherein the step of receiving a request to adjust the signal quality parameter comprises the step of receiving a request to adjust a volume parameter.

12. The method of claim 10 wherein the step of determining if the signal quality parameter should be adjusted by circuitry local to the remote unit comprises the step of determining if the circuitry local to the remote unit is operating at a maximum level.

13. The method of claim 10 wherein the step of adjusting the signal quality parameter comprises the steps of:

determining if the signal quality parameter can be adjusted by circuitry remote from the remote unit;

adjusting the signal quality parameter with the circuitry local to the remote unit if the signal quality parameter can be adjusted by circuitry local to the remote unit, sending a message to circuitry remote from the remote unit for adjustment of the signal quality parameter if the circuitry remote from the remote unit can be adjusted and the circuitry local to the remote unit cannot be adjusted, otherwise not adjusting the signal quality parameter.

14. In a wireless communication system having a remote unit capable of controlling circuitry local to the remote unit for adjustment of a quality parameter of a signal output by the remote unit, a method for signal adjustment of the quality parameter, the method comprising the steps of:

receiving a message sent in a wireless manner, the message containing instructions to adjust the quality parameter;

a controller having the downconverted message as an input and in response to the downconverted message, controlling circuitry local to the infrastructure equipment for adjustment of the first signal quality parameter;

determining if the signal quality parameter cannot be adjusted by circuitry remote from the remote unit; and sending a message to the remote unit based on the determination that causes the remote unit to cease transmitting the message sent in a wireless manner.

* * * * *